United States Patent
Roth

(10) Patent No.: US 7,045,162 B2
(45) Date of Patent: May 16, 2006

(54) METHOD FOR SUPPRESSING MICROBE ACTIVITY IN MEAT STORAGE ENCLOSURES

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 257 days.

(21) Appl. No.: 10/315,453

(22) Filed: Dec. 10, 2002

(65) Prior Publication Data

US 2004/0109925 A1 Jun. 10, 2004

(51) Int. Cl.
 A23L 3/3445 (2006.01)
 A23L 3/3454 (2006.01)
(52) U.S. Cl. .................. 426/231; 426/319; 426/332; 426/335; 426/641; 426/646
(58) Field of Classification Search ................ 426/231, 426/319, 332, 335, 641, 646
 See application file for complete search history.

(56) References Cited

U.S. PATENT DOCUMENTS

| | | | |
|---|---|---|---|
| 3,023,109 A | 2/1962 | Hines | |
| 3,117,427 A | 1/1964 | Gessel | |
| 3,122,748 A | 2/1964 | Beebe, Jr. | |
| 3,547,576 A | 12/1970 | Sheikh | |
| 4,777,018 A | 10/1988 | Auchincloss | |
| 4,919,955 A | 4/1990 | Mitchell | |
| 5,163,361 A | 11/1992 | Fox et al. | |
| 5,174,967 A | 12/1992 | Fukuhara | |
| 5,318,789 A | 6/1994 | Nakagawa et al. | |
| 5,389,390 A | * 2/1995 | Kross | .......... 426/332 |
| 5,393,547 A | 2/1995 | Balaban et al. | |

(Continued)

FOREIGN PATENT DOCUMENTS

JP   58047429 A   3/1983

(Continued)

OTHER PUBLICATIONS

Author unknown, "Mott Sparger Application; pH Control—Neutralizing Alkaline Solutions," Mott Industrial, Division of Mott Corporation, Feb. 1996.

(Continued)

Primary Examiner—Arthur L. Corbin
(74) Attorney, Agent, or Firm—Russell D. Culbertson; The Culbertson Group, P.C.

(57) ABSTRACT

An enclosure treatment method includes introducing a pH increasing material into an enclosure adapted to contain meat products. Introducing the pH increasing material creates a desired pH increasing gas content in the atmosphere within the enclosure. The method also includes the step of maintaining the pH increasing gas content in the enclosure atmosphere while meat products are contained in the enclosure. The pH increasing gas in the enclosure atmosphere is absorbed into water in the enclosure to increase the pH of the water. The water affected in the present treatment process may be moisture collecting on various surfaces within the enclosure, or may be moisture within the meat products being stored in the enclosure. In any event, the increased pH is inhospitable to most microbes and reduces or suppresses microbe activity in the water either by retarding propagation or killing microbes outright.

21 Claims, 3 Drawing Sheets

U.S. PATENT DOCUMENTS

Figure 1:
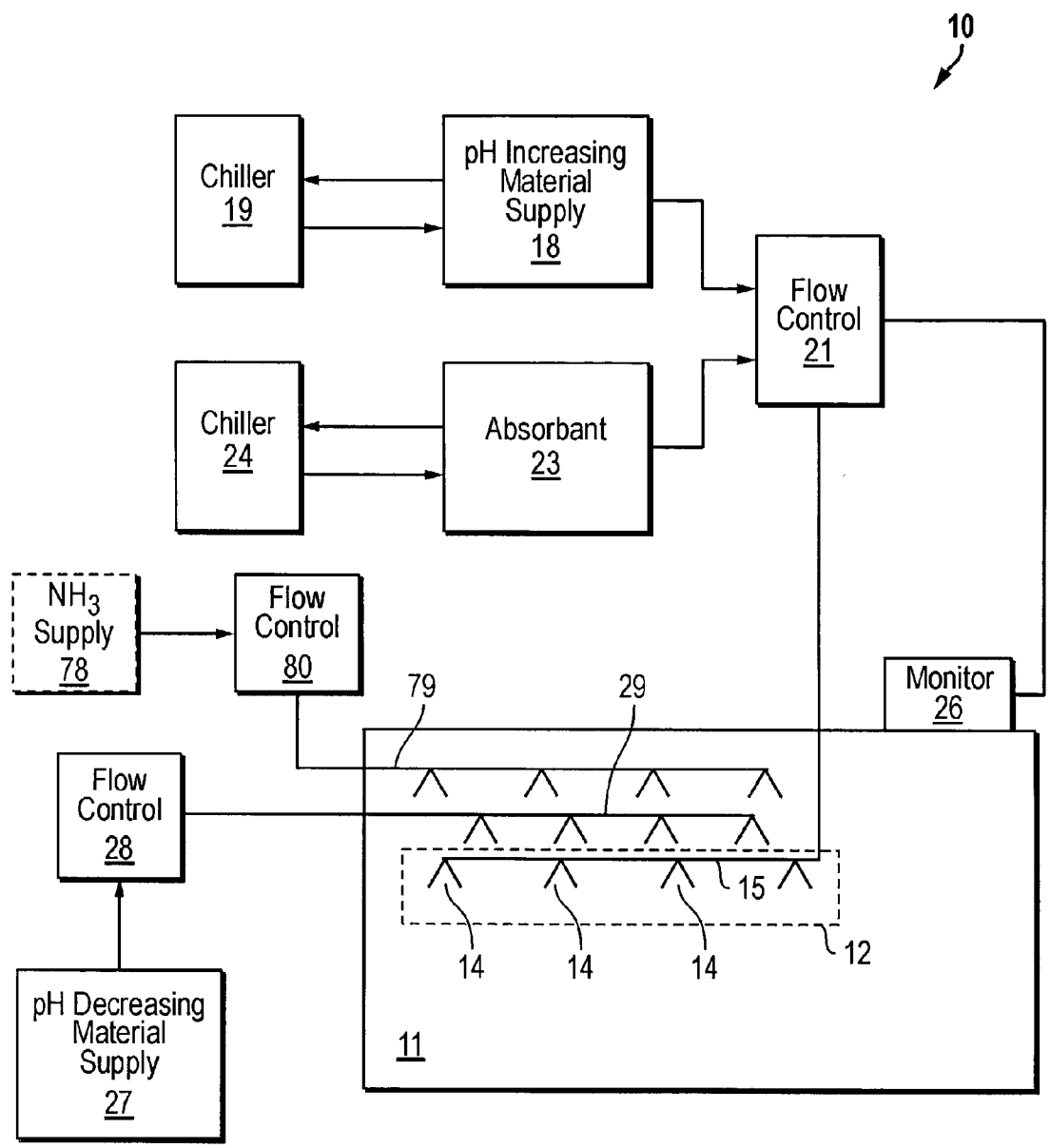

| | | | |
|---|---|---|---|
| 5,433,142 A | 7/1995 | Roth | |
| 5,514,344 A | 5/1996 | D'Agaro | |
| 5,871,795 A * | 2/1999 | Roth | 426/319 |
| 6,142,067 A * | 11/2000 | Roth | 99/534 |
| 6,387,426 B1 | 5/2002 | Roth | |

FOREIGN PATENT DOCUMENTS

| | | |
|---|---|---|
| JP | SHO 64-39965 | 2/1989 |
| JP | 03004737 A | 1/1991 |
| SU | 2081186/13 | 12/1976 |
| WO | WO 93/17562 | 9/1993 |

OTHER PUBLICATIONS

Author unknown, "A Guide To Advanced Steam Sparging," Mott Industrial, Division of Mott Corporation, Feb. 1996.

Author unknown, "Sparging/Gas-Liquid Contacting Design Guide & Part Selection," Mott Corporation, Feb. 1996.

* cited by examiner

METHOD FOR SUPPRESSING MICROBE ACTIVITY IN MEAT STORAGE ENCLOSURES

TECHNICAL FIELD OF THE INVENTION

This invention relates to microbe suppression in foodstuffs. More particularly, the invention relates to the suppression of microbe propagation in meat storage enclosures, especially enclosures in which meat is chilled.

BACKGROUND OF THE INVENTION

Modern meat processing facilities employ special practices and equipment to help ensure that the meat being processed does not become contaminated with pathogenic bacteria such as certain strains of *E. Coli, Salmonella,* and Staph bacteria, for example. However, even with careful handling, meat products are almost inevitably exposed to pathogenic microbes in the course of processing. Furthermore, nonpathogenic bacteria are also inevitably present in the meat being processed and propagate as part of the natural decay process of the meat. Meat processing facilities chill meat quickly after slaughter to help reduce the growth rate of all types of bacteria in the meat product and to slow the natural decay processes in the meat. However, simply chilling meat does not kill most types of bacteria that may be present in meat, and allows many types of microbes to continue to propagate.

Meat processing generally includes a series of initial processing steps and then a number of final processing steps which result in the final meat products. In the initial processing steps, the animal is slaughtered, skinned, and cleaned to produce a whole carcass which is then usually cut into halves or sides. These whole or substantially whole carcasses are then cooled to an initial processing temperature and stored at that initial processing temperature for a period of time. After this initial refrigerated storage, the whole carcasses move on to the final processing steps in which the carcasses are cut down by butchering or trimming operations into the final products such as steaks, roasts, filets, and more finely comminuted products such as ground meat. Final processing may also include special processes that recover lean meat from trimmings left after conventional trimming operations.

In the initial processing, a carcass may be steamed in a steam cabinet and subjected to antibacterial washes while the carcass is still at or near slaughter temperature. This initial cleaning helps reduce the number of viable microbes on the carcass. The chilling or cooling is generally performed after these initial cleaning and antibacterial steps to take the carcass down from the slaughter temperature of approximately 100 degrees Fahrenheit to the initial storage temperature usually between 35 to 45 degrees Fahrenheit. This cooling is normally accomplished in two separate steps using two different chilling systems. In the first cooling step, the hot (slaughter temperature) carcass is placed in a first chiller commonly referred to as a "hot box" to begin the cooling process. After being cooled to some extent in the hot box, the carcass is transferred to a separate "holding cooler" for reducing the temperature of the carcass further and then holding the carcass within the desired temperature range for a period of time normally between 24 and 48 hours. From the holding cooler, the carcass is generally transferred to a location for final processing, either at the slaughter facility or at a separate final processing facility.

Hot boxes and holding coolers associated with initial meat processing operations commonly include a system for introducing a fine mist of chilled water into the enclosure. This water is added to the respective enclosure for the purpose of controlling shrinkage in the carcasses held in the enclosure. These misting systems generally include a supply of water, a chilling system for the water, and some arrangement for spraying the water into the enclosure in a fine mist.

Although the whole carcass may be subjected to processes immediately after slaughter to reduce microbe content on the carcass, these anti-microbial efforts inevitably leave viable microbes on the carcass for the initial cooling steps. The carcass itself may thus be a source of contamination for the hot box and holding cooler. A hot box, holding cooler, or other enclosure for meat products may also be contaminated with microbes introduced during service operations, with air-borne microbes, or with microbes introduced into the enclosure through the spray chilling system. The contaminating microbes may then spread throughout the enclosure and ultimately spread to previously uncontaminated meat products held in the enclosure. Thus, it is desirable to provide a method and apparatus for suppressing microbial activity or growth in the initial cooling enclosures and other enclosures in which meat may be held.

Prior hot box or holding cooler water misting systems have employed small quantities of chlorine in the water to help control microbial activity in the misting water and in the enclosure itself. Chlorinated misting water is disfavored, however, due to the detrimental effect of chlorine on the enclosure and associated equipment. Also, chlorinated misting water provides an antibacterial affect generally only on surfaces the mist reaches. Chlorinated misting water also may have a detrimental effect on the meat products stored in the enclosure. It is therefore desirable to provide an alternative and more effective method and system for suppressing microbial activity in enclosures used to hold meat products, especially coolers associated with initial meat processing operations.

SUMMARY OF THE INVENTION

A method according to the present invention includes introducing a pH increasing material into an enclosure adapted to contain meat products. Introducing the pH increasing material creates a desired pH increasing gas content in the atmosphere within the enclosure. The method also includes the step of maintaining the pH increasing gas content in the enclosure atmosphere while meat products are contained in the enclosure. The pH increasing gas in the enclosure atmosphere at the desired pH increasing gas content is absorbed into water in the enclosure and is effective to increase the pH of the water. Water affected in the present treatment process may be independent moisture either in the enclosure atmosphere or moisture collected on various surfaces within the enclosure (enclosure component surfaces or meat surfaces), or may be moisture near the surface (that is, at the surface level) of the meat products being stored in the enclosure. In any event, the increased pH is inhospitable to most microbes, especially gram negative microbes, and reduces or suppresses microbe activity in the water either by retarding propagation or killing microbes outright. As used in this disclosure and the accompanying claims, the phrase "suppressing microbe activity" means reducing the rate of propagation or population growth of one or more microbe strains in the enclosure. This definition includes but is not limited to actually killing microbes in the enclosure.

The pH increase in moisture within a given enclosure may vary depending upon the nature of the moisture. Independent moisture, that is, moisture comprising water located on the enclosure surfaces and related equipment surfaces for example, may have a starting pH of about 7.0 without any treatment. The pH increasing gas content produced in the enclosure atmosphere according to the present invention may raise the pH of this independent moisture to approximately 8.0 or higher. This increase of at least one point in independent moisture in the enclosure is the preferred pH increase in independent moisture occasioned by the pH increasing gas content in the enclosure atmosphere according to the present invention. However, the starting pH of moisture at the surface level of meat held in the enclosure may be significantly below 7.0 due to solutes in this moisture. For example, the starting pH of moisture within meat products held in the enclosure may be approximately 5.7 to 5.9. The pH increasing gas content in the enclosure atmosphere according to the present invention may increase the pH of this meat associated moisture at a different rate and to a different degree than independent moisture in the enclosure. It is anticipated that the pH level of independent moisture in the enclosure will commonly be increased to levels higher than the moisture at the surface level of the meat held in the enclosure. Increasing the pH of moisture at the surface level of the meat products may suppress microbial activity in the moisture. It is believed that the present invention is also very effective in reducing or suppressing microbial activity in independent moisture in the enclosure. The importance of suppressing microbial activity in independent moisture in the enclosure is to reduce the risk of microbes propagating in the independent moisture, and then contaminating the meat products as the products are held in the enclosure, or are inserted or removed from the enclosure.

The method according to the invention is ideally suited for use with enclosures in which meat is refrigerated or chilled, especially the initial refrigeration devices used in initial meat processing operations. In forms of the invention in which the enclosure comprises an enclosure of a chiller or refrigeration unit such as a hot box or holding cooler used in initial meat processing operations, the pH increasing gas from the enclosure is also preferably allowed to flow into the air handling conduits and enclosures associated with the heat exchanger for the refrigeration system. Thus, the invention is not only effective for suppressing microbe activity within the enclosure itself, but is also effective for suppressing microbe activity in associated equipment that is in communication with the enclosure atmosphere.

The preferred pH increasing gas comprises ammonia gas. Thus, the preferred pH increasing material comprises an ammonia-based material such as ammonia itself, ammonium hydroxide solution (aqueous ammonia), or any other material that produces the desired ammonia gas content in the enclosure atmosphere. The desired ammonia gas content in the enclosure is at least approximately 3 parts per million.

Ammonium hydroxide comprises the preferred pH increasing material for use in enclosures associated with meat chilling or refrigerating systems, especially those systems in which shrinkage control is desired. Ammonia molecules may escape from the solution to produce the desired ammonia gas content in the enclosure atmosphere. The water included in the solution provides the desired shrinkage control. The pH increasing material comprising ammonium hydroxide solution may be introduced into the enclosure through prior art misting/shrinkage control systems associated with refrigerated meat enclosures.

Excess pH increasing gas may be removed from the enclosure atmosphere according to the present invention by absorbing the pH increasing gas into an absorbant. The absorbant may be placed in the enclosure or the enclosure atmosphere may be removed from the enclosure temporarily and placed in contact with the absorbant. In one preferred form of the invention, the absorbant comprises water which is sprayed or misted into the enclosure atmosphere to absorb excess pH increasing gas.

In addition to absorbing excess pH increasing gas in the enclosure atmosphere, the invention encompasses cycling the pH of moisture in the enclosure by the introduction of a pH decreasing material. The preferred pH decreasing material comprises carbon dioxide gas. This pH decreasing material may be introduced in any suitable fashion to effect a reduction in the pH in moisture in the enclosure.

The pH increasing material may be manually introduced into the enclosure atmosphere to produce and maintain the desired pH increasing gas content in the enclosure atmosphere. However, the invention preferably provides automatic control for producing and maintaining the desired pH increasing gas content in the enclosure atmosphere. In order to facilitate automated control, one preferred form of the invention includes monitoring the content of the pH increasing gas in the enclosure atmosphere and producing a monitor output indicative of the pH increasing gas content in the enclosure atmosphere. The addition of pH increasing material into the enclosure may be controlled through a suitable valve and valve control apparatus and/or a variable output pump in response to a signal derived from the monitor output. Also, excess pH increasing gas may be removed from the enclosure atmosphere in response to the signal derived from the monitor output.

An apparatus for suppressing microbe activity according to the present invention includes a pH increasing material supply or vessel adapted to contain a supply of pH increasing material. The apparatus further includes one or more release ports located to release the pH increasing material either directly or indirectly into the enclosure. A flow control arrangement such as a suitable arrangement of valves is interposed between the pH increasing material supply and the release port or ports for selectively directing the pH increasing material from the pH increasing material supply to the release port or ports to be released into the atmosphere within the enclosure. This flow control arrangement may be automated to control the addition of pH increasing material into the enclosure in response to a signal derived from an output provided by a suitable pH increasing gas monitor. Also, the same flow control arrangement may also be connected to a water supply or other absorbant material supply and used to control the addition of water or other absorbant material to the enclosure to reduce the pH increasing gas content in the enclosure atmosphere.

Forms of the invention that cycle the pH of moisture in the enclosure also include a supply of pH decreasing material and a flow control and release arrangement for introducing the pH decreasing material periodically in the enclosure. The flow control and release arrangement may be separate from those elements for introducing the pH increasing material, or may be shared.

The pH increasing gas maintained in the enclosure atmosphere facilitates the suppression of microbe activity throughout the enclosure anywhere water or moisture collects. This includes cracks and crevices within the enclosure and on the surfaces of the meat products themselves. Regardless of where the water is located within the enclosure or associated equipment, when the pH increasing gas comes in contact with the water, molecules of the pH increasing gas go into solution in the water to increase the pH of the water and thereby render the water inhospitable to most microbes. The pH increasing material also has the effect of suppressing microbial activity in the equipment used to introduce the pH increasing material into the enclosure. Also, the present invention may be used to suppress microbe activity continuously while the enclosure is in use to contain meat products. Thus, the enclosure need not be taken out of service in order to effect the desired microbe activity suppression.

These and other advantages and features of the invention will be apparent from the following description of the preferred embodiments, considered along with the accompanying drawings.

BRIEF DESCRIPTION OF THE DRAWINGS

FIG. 1 is a diagrammatic representation of an apparatus embodying the principles of the invention for suppressing microbe activity in an enclosure containing meat products.

FIG. 2 is a diagrammatic representation of a pH increasing material supply suitable for use in the apparatus shown in FIG. 1.

FIG. 3 is a diagrammatic representation of an alternate or additional arrangement for introducing a pH increasing material into an enclosure within the scope of the present invention.

DESCRIPTION OF PREFERRED EMBODIMENTS

Referring to FIG. 1, an apparatus 10 embodying the principles of the invention is adapted to introduce a pH increasing material into an enclosure 11 to produce a desired pH increasing gas content in the atmosphere within the enclosure. Apparatus 10 also maintains a desired pH increasing gas content in the enclosure atmosphere. The apparatus 10 shown in FIG. 1 is particularly suited for use with chillers such as a hot box or holding cooler used in initial meat processing operations, or holding coolers used in final meat processing operations. However, the invention is not limited to these applications. Rather enclosure 11 may be any enclosure for containing meat products, whether the meat product is in the form of substantially whole carcasses, coarsely comminuted meat products such as steaks, roasts, and filets, or finely comminuted meat products such as ground beef. FIG. 1 shows treatment apparatus 10 associated with a single enclosure 11. However, it will be appreciated that a treatment system according to the invention may be used to introduce the pH increasing material and maintain the desired pH increasing gas content in a series of separate enclosures.

Apparatus 10 includes a release device 12 associated with each enclosure 11 to be treated. Release device 12 is adapted to release the pH increasing material either directly or indirectly into the enclosure through one or more release ports 14. FIG. 1 shows release device 12 made up of a series of release ports 14 connected to a distribution conduit 15 mounted within enclosure 11. The nature of ports 14 will depend upon the nature of the pH increasing material used according to the invention. Where the pH increasing material comprises an ammonium hydroxide solution, for example, ports 14 may comprise nozzles adapted to spray a fine mist of the solution into the respective enclosure, and preferably onto meat products held in the enclosure. Where the pH increasing material is a gas, such as a mixture including ammonia gas, ports 14 may simply comprise open conduits for releasing the material into enclosure 11. Whether the ports 14 comprise spray nozzles or other release devices, the devices themselves may perform a flow control function. For example, spray nozzles adapted to release a fine mist of pH increasing material into enclosure 11 may comprise constant flow rate nozzles adapted to provide a desired flow rate of material into the enclosure over a given input pressure range.

Apparatus 10 shown in FIG. 1 includes a pH increasing material supply 18. pH increasing material supply 18 provides a supply of the desired pH increasing material for use according to the present invention. Additional equipment may be associated with supply 18 depending upon the nature of the pH increasing material being used. For example, where the pH increasing material comprises a liquid such as ammonium hydroxide solution, the liquid is preferably chilled to a suitable temperature prior to introduction into enclosure 11. FIG. 1 shows a chiller 19 associated with supply 18 for this purpose. Chiller 19 may be any device suitable for maintaining the temperature of the pH increasing material in supply 18 at a proper temperature for introduction into enclosure 11.

FIG. 1 also shows that apparatus 10 includes a flow control arrangement 21 connected between pH increasing material supply 18 and release ports 14. Flow control arrangement 21 comprises an arrangement of valves or other flow control devices for controlling the release of pH increasing material into enclosure 11. The devices making up flow control arrangement 21 may be manually operated or may be automated to introduce pH increasing material into enclosure 11 and maintain the desired pH increasing gas content in the enclosure atmosphere. A particular flow control arrangement will be described below for purposes of example with reference to FIG. 2. It will be appreciated that although flow control arrangement 21 is shown separate from release device 12, flow control elements for performing the functions provided by the flow control arrangement may be integrated with the release device, particularly with nozzles included with the release device.

The form of the invention shown in FIG. 1 includes an arrangement for reducing the pH increasing gas content in enclosure 11 in the event the concentration of pH increasing gas in the enclosure becomes excessive or must otherwise be reduced for some purpose. Any suitable arrangement may be used to reduce the pH increasing gas content in enclosure 11. For example, the invention encompasses a venting arrangement for releasing or withdrawing atmosphere from the enclosure to remove excess pH increasing gas. Alternatively, the invention encompasses absorbing pH increasing gas from the enclosure atmosphere. The pH increasing gas may be absorbed from the enclosure atmosphere while the atmosphere is in the enclosure or while the enclosure atmosphere is temporarily removed from the enclosure. The form of the invention shown in FIG. 1 includes the former pH increasing gas absorbing arrangement. In particular, FIG. 1 shows an absorbant material supply 23 and a chiller 24 for chilling the absorbant material to a temperature suitable for introducing the material into enclosure 11. Where the pH increasing gas comprises ammonia, the absorbant material may comprise water which may be introduced into enclosure 11 through release ports 12 under the control of flow control arrangement 21 as indicated in FIG. 1. In this arrangement, flow control arrangement 21 would fully or partially switch from introducing the pH increasing material to introducing the absorbant material in order to reduce the pH increasing gas content in the enclosure atmosphere.

Although the apparatus according to the invention may be controlled manually to produce and maintain the desired pH increasing gas content in the enclosure atmosphere, alternate forms of the invention may rely on automated control systems. To provide automated control of pH increasing gas content in the enclosure atmosphere, a monitor 26 may be associated with enclosure 11 for providing a monitor output indicative of the pH increasing gas content in the enclosure atmosphere. This monitor output may be directed to flow control arrangement 21 as indicated in FIG. 1, and the flow control arrangement may include programmable logic controllers (not shown) or other control equipment for controlling the release of pH increasing material and/or absorbant material into enclosure 11. These types of process control devices are well known in the art and thus further information on these devices is omitted from this disclosure so as not to obscure the invention in unnecessary detail.

Apparatus 10 shown in FIG. 1 also includes an arrangement for introducing a pH decreasing material into enclosure 11. The preferred pH decreasing material produces a desired pH decreasing gas content in the enclosure atmosphere. The pH decreasing gas may be absorbed into moisture in the enclosure to lower the pH of the moisture. A preferred pH decreasing gas comprises carbon dioxide gas. Carbon dioxide gas dissolves in water to produce carbonic acid ($H_2CO_3$) which reduces the pH of the water. The pH decreasing material may be carbon dioxide itself or a carrier such as carbonated water. In the case of carbonated water, the pH decreasing material may be introduced into enclosure 11 through flow control arrangement 21 and release device 12. Alternatively, the pH decreasing material may be directed from a supply 27 through a separate control arrangement 28 and release arrangement 29 as shown in FIG. 1. In either case, the pH decreasing material may be introduced either directly or indirectly into enclosure 11, and may also be released into air handling conduits and devices associated with the enclosure.

Figure 2:
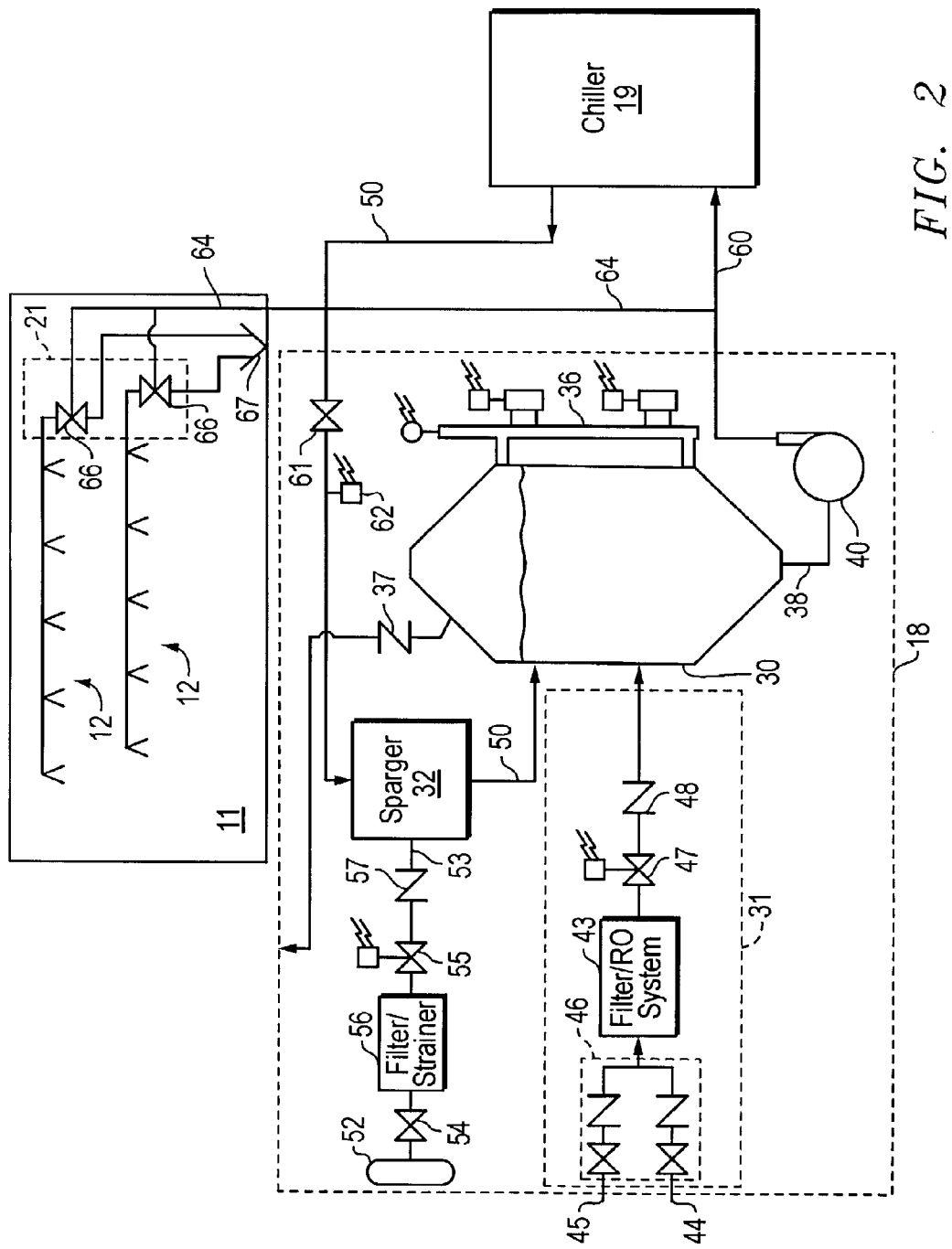

FIG. 2 shows a more detailed example of a pH increasing material supply 18 according to one preferred form of the invention. This particular pH increasing material supply 18 is adapted to produce a pH increasing material made up of ammonium hydroxide solution (aqueous ammonia) for introduction into enclosure 11. Thus, the arrangement may replace or at least augment a water misting arrangement that may otherwise be associated with the enclosure. pH increasing material supply 18 includes a vessel 30 for containing aqueous ammonia. A water supply generally shown at reference numeral 31 provides makeup water to vessel 30, and an ammonia gas sparger 32 is included for sparging ammonia gas into the water to produce the desired aqueous ammonia. A chiller 19 is also associated with vessel 30 for chilling the vessel contents to the desired temperature for introduction into enclosure 11.

Supply vessel 30 may comprise any vessel suitable for containing a supply of chilled aqueous ammonia. The illustrated, preferred supply vessel 30 includes a level monitoring arrangement 36 for monitoring the liquid level in the vessel, and a pressure relief valve 37 providing pressure relief for ammonia gas that collects above the liquid level in the supply vessel. Supply vessel 30 includes two inputs. One input is from makeup water supply 31 while the other input is associated with sparger 32. A lower portion of supply vessel 30 is connected to an output line 38 which leads to pump 40. Pump 40 provides the driving force for directing the pH increasing material to the flow control arrangement 21 and enclosure 11, and for providing circulation through chiller 19 and sparger 32 as will be described further below.

The illustrated water supply 31 includes a filter and reverse osmosis system 43 connected to a low temperature water supply line 44 and a higher temperature water supply line 45 through an arrangement of control and check valves shown generally at reference numeral 46. Flow from filter unit 43 into supply vessel 30 is controlled by a remotely controlled valve 47. A check valve 48 is included in the makeup water supply line for preventing ammonium hydroxide solution from flowing back into the filter/reverse osmosis unit 43.

Sparger 32 may comprise any suitable device for adding or sparging ammonia gas into water to produce the desired ammonium hydroxide solution. For example, sparger 32 may comprise a MOTT GasSaver® inline sparger manufactured by Mott Corporation of Farmington Conn. The preferred sparging device may be connected in line 50 to release or sparge ammonia gas in a controlled fashion into the material flowing through line 50. The ammonia gas goes into solution in the water included in the material to produce the desired ammonium hydroxide solution. The ammonia gas sparged into the material flowing through line 50 is supplied from an ammonia gas supply 52 through a flow line 53 fitted with control valves 54 and 55, a filter/strainer 56, and a check valve 57.

The form of the invention shown in FIG. 2 places sparger 32 in line 50 which comprises a recycle line from chiller 19 back to vessel 30. Other forms of the invention may add ammonia gas at different points in the system to provide the desired ammonium hydroxide solution. For example, an ammonia sparger could alternatively be associated with the makeup water supply line for sparging ammonia into the makeup water before reaching vessel 30. An ammonia sparging arrangement could also be placed in vessel 30 itself. In yet another alternative, ammonia gas may be sparged into water as water is directed to the release device 12 at enclosure 11. This alternate arrangement could eliminate vessel 30 from the pH increasing material supply arrangement 18. However, this latter arrangement would still comprise a supply of the pH increasing material as represented at 18 in FIG. 1 even though the material would be mixed on the fly without having to be held in a holding vessel such as vessel 30.

Chiller 19 takes the output of pump 40 through line 60 and chills the material in a suitable heat exchange arrangement. The output from chiller 19 is directed through line 50 through a back pressure device such as an orifice 61 to sparger 32, and ultimately back to vessel 30. A pH probe 62 is preferably associated with recycle/sparger line 50 for measuring the pH of the material in the line upstream from sparger 32. This pH reading may be used to control the amount of ammonia gas sparged into the material through sparger 32. For example, the pH reading provided by probe 62 may be used in controlling valve 55 to increase or decrease the pressure of ammonia gas supplied to sparger 32. The pH reading at probe 62 may also be used to provide a control input to the flow control arrangement (21 in FIG. 1) which controls the release of pH increasing material into enclosure 11.

The pH increasing material is directed to enclosure 11 through line 64 which branches from line 60. Line 64 directs the pH increasing material to a separate control valve 66 for each different release device 12 used to release the pH increasing material into enclosure 11. Each valve 66 comprises a remotely controlled three-way valve that may direct pH increasing material from line 64 to the respective release device 12 or to a drain 67 associated with enclosure 11. The flow control arrangement in the form of the invention shown in FIG. 2 is made up of valves 66. Pump 40 may also be considered as part of the flow control arrangement in the system shown in FIG. 2 to the extent that the pump may be turned off or its output varied to control the amount of pH increasing material released into enclosure 11. Nozzles associated with release device 12 may also be considered to be part of the flow control arrangement for controlling the release of pH increasing material into enclosure 11.

It will be noted that the flow control arrangement 21 shown in FIG. 2 does not include an input from an absorbant material supply such as supply 23 shown in FIG. 1. In the configuration shown in FIG. 2, a separate system may be connected to enclosure 11 for releasing an absorbant material such as water into the enclosure to absorb excess ammonia gas in the enclosure atmosphere. Also, the flow control arrangement 21 in FIG. 2 does not include an input from a pH decreasing material supply such as supply 27 discussed above with reference to FIG. 1.

Figure 3:
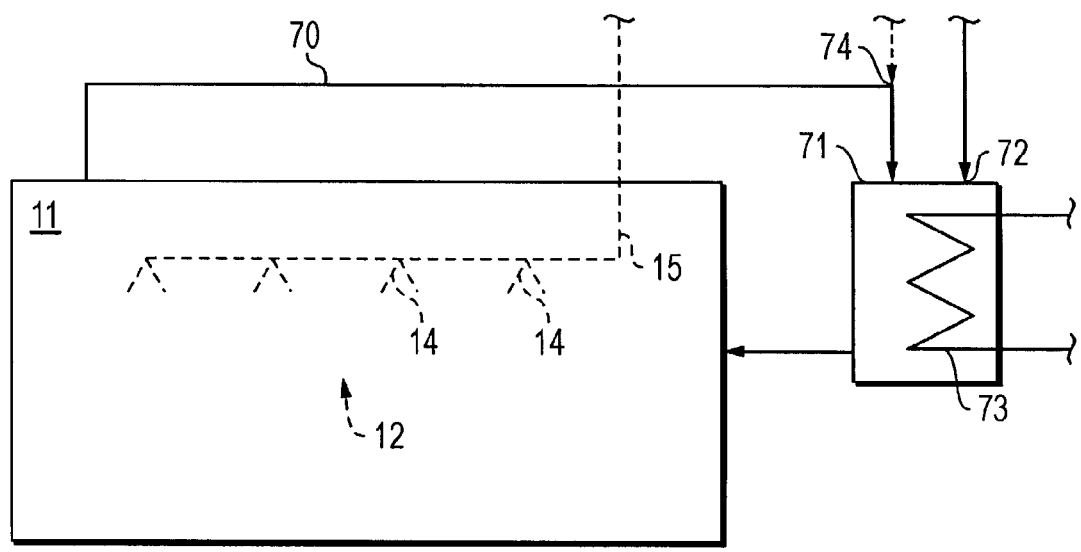

FIG. 3 shows an alternate arrangement for introducing pH increasing material into enclosure 11. In this alternate arrangement, the pH increasing material is released indirectly into enclosure 11 through the air handling conduits 70 and an enclosure 71 associated with a chilling or refrigeration system for enclosure 11. One release port 72 may be at the enclosure 71 housing refrigerant coils 73 for the enclosure refrigeration system. An alternate release port 74 may be into conduit 70 upstream of enclosure 71. In either case, releasing the pH increasing material into the refrigeration system air handling conduits ensures that the pH increasing gas reaches both the enclosure 11 and also the associated equipment which may harbor pathogenic microbes that could ultimately reach the meat products being stored in enclosure 11. This reach of pH increasing gas according to the invention ensures suppression of microbial activity not only in enclosure 11 but also in the air handling equipment associated with the enclosure. The release ports 72 and 74 may be in addition to or in lieu of release ports within enclosure 11 as indicated by dashed line 15 and release ports 14 shown in FIG. 3. Even where the pH increasing material is released directly into enclosure 11, the pH increasing gas may reach equipment associated with enclosure 11 to provide the desired microbe suppression in that associated equipment.

The method of the invention may be described now with reference to the apparatus 10 shown in FIG. 1. The method includes introducing the pH increasing material into the enclosure atmosphere within enclosure 11 to create the desired pH increasing gas content in the enclosure atmosphere. The method also includes maintaining the desired pH increasing gas content in the enclosure atmosphere while meat products (not shown) are contained in enclosure 11.

In the form of the invention shown in FIG. 1, the step of introducing the pH increasing material into the enclosure atmosphere comprises directing the material from the pH increasing material supply 18 under the control of flow control arrangement 21 to one or more release ports included within enclosure 11. Where the pH increasing material comprises ammonium hydroxide solution, the desired pH increasing gas content in the enclosure atmosphere is created as ammonia molecules escape from the ammonium hydroxide solution within enclosure 11. Alternatively to producing the desired pH increasing gas content indirectly in this fashion, the pH increasing gas may be released directly into the enclosure atmosphere. For example, a mixture of gasses including an appropriate fraction of ammonia gas may be released directly into the enclosure atmosphere through a suitable flow control arrangement. Ammonium hydroxide solution comprises the preferred pH increasing material because the water in the solution also may serve to control shrinkage in meat products within enclosure 11.

The step of maintaining the desired pH increasing gas content in the enclosure atmosphere comprises adding pH increasing material to the enclosure for a period of time effective for producing the desired pH increase in the moisture in the enclosure. This may include adding the pH increasing material for only a very short period of time, or continuously or periodically adding pH increasing material into enclosure 11 through flow control arrangement 21 and release port or ports 14 over a relatively long period of time. The time required for this maintaining step may be on the order of a minute where a highly concentrated pH increasing material is used such as a gas including a high ammonia fraction. However, it may be desirable to continuously or periodically add additional pH increasing material because the pH increasing gas in the enclosure atmosphere is continuously absorbed into moisture within the enclosure and associated equipment. For example, the pH increasing gas will be absorbed into moisture associated with the meat products contained in the enclosure. pH increasing gas is also absorbed into moisture collecting on various other surfaces within enclosure 11 and the air handling equipment associated with the enclosure. This increased pH inhibits or suppresses microbe activity in the moisture, wherever the moisture may be located, but especially in independent moisture within the enclosure.

A relatively small concentration of ammonia gas in the enclosure atmosphere will produce a sufficient pH increase in moisture within enclosure 11 to provide microbe suppression according to the present invention. The ammonia gas concentration at a maintenance content level effective for producing a pH increase in moisture in the enclosure should be at least 3 parts per million. Higher concentrations may also be employed within the scope of the invention. Where the pH increasing material comprises ammonium hydroxide solution, such a solution having a pH of 8.0 to 11.0 or higher is preferred for producing the desired pH increasing gas content.

Generally, it is desirable to increase the pH of independent moisture within the enclosure to a pH above 7.0, and preferably above 8.0. A pH at 8.0 or above will significantly reduce microbe activity within the independent moisture, while lower pH levels will provide a somewhat diminished effect on microbe activity. The invention may produce a pH increase from an initial pH of approximately 5.7 to an increased pH of approximately 7.0 or more in moisture at the surface level of the meat in the enclosure. The pH increasing gas concentration should not be maintained at a level that would permanently and adversely impact the flavor of the meat products stored in enclosure 11.

The particular concentration of pH increasing gas in the enclosure atmosphere necessary to produce the desired increase in the pH of moisture in the enclosure depends upon a number of factors. The solubility of the pH increasing gas in water will be one factor in determining the desired pH increasing gas content for a given enclosure atmosphere. The amount of moisture in the enclosure, the starting pH of the moisture in the enclosure, and the nature of other constituents that may be dissolved in or held with the moisture are other factors to be considered in determining the desired pH increasing gas content for a given enclosure atmosphere. Other constituents making up the enclosure atmosphere may also have an impact on the content of pH increasing gas in the enclosure atmosphere according to the invention. Furthermore, the temperature of moisture in a given enclosure will affect the ability of the moisture to absorb the pH increasing gas from the enclosure atmosphere, and will thus be a factor in the determining the desired pH increasing gas content in the enclosure atmosphere. Where the pH increasing gas is ammonia gas, the gas will go into solution in the moisture more readily at lower temperatures within the range used in meat chilling enclosures, for example, 35 to 45 degrees Fahrenheit. It is therefore advantageous to maintain the enclosure atmosphere and moisture in the enclosure at relatively low temperatures to generally reduce the pH increasing gas content in the enclosure atmosphere necessary to produce the desired pH increase in moisture held in the enclosure.

It may be desirable to periodically spike or raise the content of pH increasing gas in enclosure 11 for a spiking time period to produce a large and preferably sudden pH increase in moisture within enclosure 11. The pH increasing gas content may, for example, be raised for a period of time to an elevated content or concentration sufficient to raise the pH in moisture in enclosure 11 to approximately 9.0 or above, and preferably 10.0 or above. The pH spiking time period at which the pH increasing gas content is held at this elevated level may be approximately five (5) minutes to two (2) hours. Shorter periods of elevated pH increasing gas content are generally preferred to ensure that the meat products held in the enclosure are not adversely affected.

pH spiking according to the present invention may be performed periodically at fixed intervals. Alternatively, the pH spiking may be performed in response to some event. For example, the pH increasing gas content in an enclosure may be held at a relatively high pH spiking or elevated level for an extended period of time (on the order of several hours) at the time an enclosure is put in service either initially, after being temporarily removed from service for maintenance operations on the enclosure or associated equipment, or in response to any event or circumstance that would allow elevated microbe levels to exist within the meat enclosure. This pH spiking may be performed with no meat in the enclosure or while meat products are held in the enclosure.

Regardless of the time at which the pH increasing gas content is held at the elevated level, the elevated pH increasing gas content level may be produced in several different fashions within the scope of the present invention. In one form of the invention, pH increasing material may be released at a relatively higher flow rate than used to maintain the desired lower or maintenance level of pH increasing gas content. Alternatively or in addition to an increased flow rate, the concentration of pH increasing material may be temporarily increased. Where the pH increasing material comprises ammonium hydroxide for example, the pH of the solution may be increased from 9.0 to 10.0 or higher in order to increase the pH increasing gas content in enclosure 11 for the desired spiking time period. In another form of the invention, the normal, relatively lower or maintenance pH increasing gas content in the enclosure atmosphere may be produced by introducing ammonium hydroxide solution to enclosure 11, and ammonia gas or a mixture including ammonia gas may be introduced in addition to the ammonium hydroxide solution to produce the elevated pH increasing gas content. The ammonia gas or ammonia gas mixture may be directed from a separate supply 78 to release arrangement 79 under the control of flow control arrangement 80 as shown in FIG. 1.

After the desired pH spiking time period has elapsed, the invention comprises reducing the pH increasing gas content back down to a lower pH maintenance level. This pH increasing gas content reduction may be accomplished by introducing an absorbant from absorbant supply 23 in FIG. 1. A pH decreasing material from supply 27 may be released into enclosure 11 alternatively to or in addition to the absorbant material to effect the desired pH increasing gas content reduction, depending upon the nature of the pH decreasing material.

Especially where the pH increasing material comprises ammonium hydroxide solution, the temperature of the pH increasing material should be chilled at least to the temperature within enclosure 11. More preferably, the invention includes chilling the pH increasing material using a chiller, such as chiller 19 in FIG. 1, to a temperature near but just above the freezing point of the pH increasing material. However, the temperature of pH increasing material should not be so low as to cause meat products in enclosure 11 to freeze unless the meat products are to be frozen prior to further processing.

The method according to the present invention may also include the step of monitoring the pH increasing gas content in the enclosure atmosphere using a monitor such as that shown diagrammatically at 26 in FIG. 1. In preferred forms of the invention, monitoring provides a substantially continuous monitor output indicative of the pH increasing gas content in the enclosure atmosphere. This monitor output signal, or a signal derived from the monitor output, is then supplied to the flow control arrangement 21 and used for controlling the addition of further pH increasing material to enclosure 11 to maintain the desired pH increasing gas content in the enclosure atmosphere.

A pH increasing gas content monitor output, or a signal derived from the monitor output, may also be used to control the removal of excess pH increasing gas from the enclosure atmosphere. In the form of the invention shown in FIG. 1, this removal of pH increasing gas is accomplished by releasing an absorbant material such as additional water from supply 23 into enclosure 11 to absorb excess pH increasing gas molecules. Alternatively, enclosure atmosphere may be temporarily removed from the enclosure being treated and excess pH increasing gas molecules may be filtered or otherwise absorbed or removed from the atmosphere prior to being returned to the enclosure.

One preferred method according to the invention further includes the step of introducing the pH increasing material into the air handling conduits associated with the heat exchanger system for the enclosure. This may be accomplished with the alternate pH increasing material release points 72 and 74 shown in FIG. 3. Releasing the pH increasing material directly into the handling conduits ensures that the pH increasing gas is available to increase the pH of moisture collecting in the air handling conduits. Other forms of the invention may rely on pH increasing gas reaching the air handling conduits in the course of normal circulation of enclosure atmosphere from the enclosure, through the air handling conduits, and back to the enclosure.

The method of the invention also encompasses the step of periodically cycling the pH of moisture in enclosure 11 from a pH above 7.0 for independent moisture to a relatively low pH below 7.0, for example, and then back to a pH above 7.0 and preferably at or above 8.0. This pH cycling may be accomplished by releasing the pH decreasing material from supply 27 in FIG. 1 into enclosure 11 through flow control arrangement 28. The pH decreasing material held in supply 27 preferably comprises carbon dioxide. The carbon dioxide may be released into enclosure 11 in gaseous or solid form or as a solution with water. In either case, the resulting carbon dioxide gas in enclosure 11 may combine with moisture in the enclosure to decrease the pH of the moisture.

Of course, any carbonic acid solution combining with moisture in enclosure 11 will also result in a pH reduction in the moisture. During the time the pH decreasing material is being released into enclosure 11, introduction of the pH increasing material from supply 18 may be temporarily halted or reduced. Once sufficient pH decreasing material has been released into enclosure 11 to reduce the pH of moisture in the enclosure to the desired level or relative amount, additional pH increasing material from supply 18 may be introduced into the enclosure to produce the desired pH increasing gas content in the enclosure atmosphere and increase the pH of moisture in the enclosure to the desired level, generally above 7.0 for independent moisture in the enclosure.

As with the pH increasing material, it will be appreciated that the pH decreasing material from supply 27 may also be released directly into air handling conduits associated with enclosure 11. This release of pH decreasing material directly into air handling conduits helps ensure that the moisture in those conduits is subjected to the desired pH change. The pH decreasing material content in the enclosure atmosphere may also be monitored similarly to the above described monitoring for the pH increasing gas, and the monitor output may be used to control the release of pH decreasing material into enclosure 11.

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A method including the steps of:
   (a) introducing a pH increasing material comprising either ammonia gas or an ammonium hydroxide solution into an enclosure atmosphere within a meat chilling enclosure to create a desired ammonia gas content in the enclosure atmosphere;
   (b) circulating the enclosure atmosphere having the desired ammonia gas content through air handling conduits associated with a heat exchanger system for the meat chilling enclosure; and
   (c) maintaining the desired ammonia gas content in the enclosure atmosphere by introducing more of the pH increasing material into the meat chilling enclosure while meat products are chilled in the meat chilling enclosure and the enclosure atmosphere is circulated through the air handling conduits associated with the beat exchanger system for the meat chilling enclosure.

2. The method of claim 1 wherein the desired ammonia gas content in the meat chilling enclosure atmosphere is at least approximately three parts per million.

3. The method of claim 1 further including the step of monitoring the ammonia gas content in the enclosure atmosphere to produce a monitor output indicative of the ammonia gas content in the enclosure atmosphere.

4. The method of claim 3 further including controlling the addition of pH increasing material to the enclosure in response to a signal derived from the monitor output.

5. The method of claim 3 further including removing ammonia gas from the enclosure atmosphere in response to a signal derived from the monitor output.

6. The method of claim 5 wherein the step of removing ammonia gas from the enclosure atmosphere includes introducing a spray of water into the meat chilling enclosure, the water included in the spray of water absorbing ammonia from the enclosure atmosphere.

7. The method of claim 1 further including the step of introducing the pH increasing material into one of the air handling conduits associated with a heat exchange system for the enclosure.

8. The method of claim 1 wherein the pH increasing material comprises ammonium hydroxide solution and wherein the step of introducing the pH increasing material includes directing a spray of the ammonium hydroxide solution into the meat chilling enclosure.

9. The method of claim 1 wherein the desired ammonia gas content in the enclosure atmosphere comprises a maintenance content effective for maintaining the pH of moisture within the meat chilling enclosure at a maintenance pH level, and further including the steps of:
   (a) raising the ammonia gas content in the enclosure atmosphere to an elevated content for a pH spiking period effective to increase the pH of moisture in the meat chilling enclosure to a pH over the maintenance pH level; and
   (b) reducing the ammonia gas content in the enclosure atmosphere to no greater than the maintenance content after the pH spiking period.

10. The method of claim 1 further including the steps of:
    (a) introducing a pH decreasing material into the meat chilling enclosure in an amount effective to reduce the pH of at least some moisture in the meat chilling enclosure below 7.0; and
    (b) after introducing the pH decreasing material into the meat chilling enclosures, introducing additional pH increasing material into the meat chilling enclosure.

11. A method for suppressing microbe activity in a meat chilling enclosure, the method including the steps of:
    (a) producing a desired ammonia gas content in an enclosure atmosphere within the meat chilling enclosure;
    (b) circulating the enclosure atmosphere including the desired ammonia gas content through air handling conduits associated with a heat exchanger system for the meat chilling enclosure; and
    (c) maintaining the desired ammonia gas content in the enclosure atmosphere by the addition of either ammonia gas or ammonium hydroxide solution into the meat chilling enclosure while a meat product is being chilled in the meat chilling enclosure and while the enclosure atmosphere is circulated through the air handling conduits associated with the heat exchanger system for the meat chilling enclosure.

12. The method of claim 11 wherein the step of producing the desired ammonia gas content in the enclosure atmosphere includes releasing ammonia gas into the enclosure atmosphere within the meat chilling enclosure.

13. The method of claim 11 wherein the step of maintaining the desired ammonia gas content in the enclosure atmosphere includes selectively removing ammonia gas from the enclosure atmosphere.

14. The method of claim 13 wherein the step of selectively removing ammonia gas from the enclosure atmosphere includes absorbing ammonia from the enclosure atmosphere.

15. The method of claim 13 wherein the step of selectively removing ammonia gas from the enclosure atmosphere is performed in response to a monitor output indicative of the ammonia gas content in the enclosure atmosphere.

16. The method of claim 11 wherein the step of maintaining the desired ammonia gas content in the enclosure atmosphere is performed in response to a monitor output indicative of the ammonia gas content in the enclosure atmosphere.

17. The method of claim 11 wherein the step of producing the desired ammonia gas content includes directing a spray of the ammonium hydroxide solution into the meat chilling enclosure.

18. The method of claim 11 wherein the desired ammonia gas content comprises a maintenance content effective for maintaining the pH of moisture within the enclosure at a maintenance pH level, and further including the steps of:
   (a) raising the ammonia gas content in the enclosure atmosphere to an elevated content for a pH spiking period, the elevated content being effective to increase the pH of moisture in the enclosure to a pH over the maintenance pH level; and
   (b) reducing the ammonia gas content in the enclosure atmosphere to the maintenance content after the pH spiking period.

19. The method of claim 11 further including the steps of:
   (a) introducing a pH decreasing material into the enclosure in an amount effective to reduce the pH of moisture in the enclosure below 7.0; and
   (b) after introducing the pH decreasing material into the enclosure, producing the desired ammonia gas content in the enclosure atmosphere within the meat chilling enclosure, wherein the desired ammonia gas content in the enclosure atmosphere is effective for increasing the pH of moisture in the enclosure to a pH at or above approximately 8.0.

20. A method including:
   (a) introducing either ammonia gas or ammonium hydroxide solution into an enclosure atmosphere within a meat chilling enclosure to create a desired ammonia gas content in the enclosure atmosphere, the desired ammonia gas content comprising a maintenance content effective for maintaining the pH of moisture within the enclosure at a maintenance pH level;
   (b) maintaining the desired ammonia gas content in the enclosure atmosphere while meat products are contained in the meat chilling enclosure;
   (c) raising the ammonia gas content in the enclosure atmosphere to an elevated content for a pH spiking period effective to increase the pH of moisture in the enclosure to a pH over the maintenance pH level; and
   (d) reducing the ammonia gas content in the enclosure atmosphere to no greater than the maintenance content after the pH spiking period.

21. A method for suppressing microbe activity in a meat chilling enclosure, the method including the steps of:
   (a) producing a desired ammonia gas content in an enclosure atmosphere within the meat chilling enclosure, the desired ammonia gas content comprising a maintenance content effective for maintaining the pH of moisture within the enclosure at a maintenance pH level;
   (b) maintaining the desired ammonia gas content in the enclosure atmosphere while meat products are contained in the meat chilling enclosure;
   (c) raising the ammonia gas content in the enclosure atmosphere to an elevated content for a pH spiking period, the elevated content being effective to increase the pH of moisture in the enclosure to a pH over the maintenance pH level; and
   (d) reducing the ammonia gas content in the enclosure atmosphere to the maintenance content after the pH spiking period.

* * * * *

UNITED STATES PATENT AND TRADEMARK OFFICE
CERTIFICATE OF CORRECTION

PATENT NO. : 7,045,162 B2  
APPLICATION NO. : 10/315453  
DATED : May 16, 2006  
INVENTOR(S) : Eldon Roth Page 1 of 1

It is certified that error appears in the above-identified patent and that said Letters Patent is hereby corrected as shown below:

Col. 13 line 49  
Change "beat" to --heat--.

Signed and Sealed this

Fifteenth Day of August, 2006

JON W. DUDAS  
*Director of the United States Patent and Trademark Office*